United States Patent [19]

Schuhmacher et al.

[11] 4,310,373

[45] Jan. 12, 1982

[54] METHOD FOR HEAT-SEALING TEXTILE MATERIALS WITH POLYURETHANE ADHESIVES

[75] Inventors: Günter Schuhmacher; Erich Fahrbach, both of Weinheim; Sepp Wagner, Gorxheimertal-Trösel, all of Fed. Rep. of Germany

[73] Assignee: Firma Carl Freudenberg, Weinheim, Fed. Rep. of Germany

[21] Appl. No.: 119,954

[22] Filed: Feb. 8, 1980

[30] Foreign Application Priority Data

Feb. 17, 1979 [DE] Fed. Rep. of Germany ....... 2906091

[51] Int. Cl.$^3$ ............................................. B32B 31/20
[52] U.S. Cl. ....................................... 156/308.2; 2/87; 156/306.6; 156/331.7; 428/200; 428/246; 428/423.1; 428/423.3; 528/65
[58] Field of Search ................... 156/306.6, 331, 308.2, 156/331.7; 2/87; 428/200, 423.1, 246, 423.3; 528/65

[56] References Cited

U.S. PATENT DOCUMENTS

| | | | |
|---|---|---|---|
| 3,252,848 | 5/1966 | Borsellino | 156/331 |
| 3,401,133 | 9/1968 | Grace et al. | 260/29.2 TN |
| 3,428,609 | 2/1969 | Chilvers et al. | 156/331 |
| 3,684,639 | 8/1972 | Kaberle et al. | 156/331 |
| 3,759,873 | 9/1973 | Husak | 260/29.2 TN |
| 4,116,741 | 9/1978 | Thoma et al. | 428/423.3 |
| 4,160,686 | 7/1979 | Nieferfellmann et al. | 156/331 |

FOREIGN PATENT DOCUMENTS 1379633  1/1975  United Kingdom ..................... 2/87

*Primary Examiner*—John J. Gallagher
*Attorney, Agent, or Firm*—Kenyon & Kenyon

[57] ABSTRACT

The invention described herein relates to a method for heat sealing the opposing surfaces of planar textile materials which comprises applying a heat-seal adhesive to at least one of the opposing surfaces of the textiles, and then pressing the opposing surfaces of the textiles together under heat and pressure to heat-seal the textile surfaces together. The heat-seal adhesive employed is a low-melting polyurethane prepared by reacting at least one diisocyanate with at least one polyol having a molecular weight between about 500 and 5000, at least one diol which is branched or includes an ether group, and at least one diol which is unbranched. The diol reactants have an average molecular weight of less than about 500. The total hydroxyl group content of the reactants exceeds or equals the total isocyanate content of the reactants.

28 Claims, No Drawings

METHOD FOR HEAT-SEALING TEXTILE MATERIALS WITH POLYURETHANE ADHESIVES

BACKGROUND OF THE INVENTION

The process of cementing textile materials together with a heat-seal adhesive is known. Thermoplastic heat-seal adhesives are applied to textiles by, for example, wiping-on powdered adhesives or thickened pastes or solutions of the adhesive, or by sprinkling-on pourable adhesive powders. It is also known to spray on the heat-seal adhesives in the form of dispersions or solutions, or to apply the adhesive in the form of filaments of fabric-web materials. The textile materials are subsequently bonded together by hot ironing. The cemented bond between the two textiles produced by the heat-sealing process should be resistant to chemical cleaners and washing.

Thermoplastics suitable for use as adhesives are primarily the polyethylenes, polyvinylchlorides and polyamides.

The use of high-pressure polyethylene as a heat-seal adhesive is disadvantageous because its resistance to chemical cleaners is inadequate. High pressure polyethylene adhesives generally cannot withstand cleaning with solvents such as perchloroethylene, since high pressure polyethylene adhesives are soluble in perchloroethylene and may swell when contacted with perchloroethylene. Although low pressure polyethylenes are resistant to cleaning, disadvantageously, they require the maintenance of severe setting conditions. The requirement of severe setting conditions limits the utility of these adhesives, and renders them unsuitable for use on sensitive fabrics, such as those described below.

Polyvinylchloride is also not optimally suited for use as a heat-seal adhesive. For plasticizing polyvinylchloride, very large quantities of plasticizers are required, i.e., about 100% based on the polyvinylchloride content, which can lead to plasticizer migration with all its associated disadvantages—namely, a decline in adhesive strength, embrittlement, etc. Also, polyvinylchloride plastisoles require setting conditions which are no longer employed by the art.

Polyamides have been widely accepted as adhesive compounds. However, due to their "hardness" they can only be considered suitable with qualification.

Polyurethane heat-seal adhesives are also known. The polyurethanes commercially available for this type of application, however, have substantial disadvantages. That is, a melting point and softening point which is too high for customary ironing temperatures and/or insufficient adhesion, and/or excessive hardness. Thus, there is no clear advantage associated with the use of known polyurethane adhesives over the polyethylene and polyamide adhesives discussed above.

Recently, thinner and more sensitive fabrics have appeared on the market, which cannot be adequately bonded with any of the above-discussed heat-seal adhesives. Raincoat fabrics, such as fine poplin fabrics, which are completely coated with a layer of polyurethane are particularly difficult to treat. If polyethylenes are used as heat-seal adhesives for these fabrics, the bond provided is minimal and inadequate. It has been found that high-pressure, as well as low-pressure, polyethylenes are unsuitable. Polyamides of various compositions likewise provide extremely little adhesion. Mixed polyvinylchloride and polyvinylacetate polymers require large amounts of plasticizer and, even then, exhibit little adhesive strength when applied to polyurethane-coated fabrics.

BRIEF DESCRIPTION OF THE INVENTION

In accordance with the foregoing, it is an object of the present invention to provide heat-seal adhesives which process well at the customary ironing temperatures, and which satisfactorily adhere to the textiles, but do not penetrate the textiles. For example, the polyurethanes employed by the method of this invention may be extruded in a known manner in the form of a spunbonded fabric onto a carrier fabric. The settable insert prepared in this manner may then be bonded to the surface of a planar textile by pressing the insert against the fabric under heat and pressure.

The polyurethane heat-seal adhesives employed by the method of this invention are well suited for use in the form of a spunbonded fabric, and are also suitable for use on the newly developed sensitive fabrics, such as raincoat fabrics, which have been coated with polyurethane. The present heat-seal adhesives do not detrimentally alter the surface appearance of the bonded fabrics. Moreover, the adhesives employed herein are resistant to washing, as well as to chemical cleaners.

The heat-seal adhesives described herein exhibit optimum properties especially when applied in the form of a spunbonded fabric. Spunbonded settable inserts prepared from the adhesives of this invention process well at customary ironing temperatures, and do not penetrate into the textile carrier. Thus, they are suitable for use on sensitive fabrics, such as the newly developed polyurethane coated raincoat fabrics.

It should be noted that the good adhesive bond achieved as a result of the application of the present adhesives to polyurethane coated fabrics is believed to be a result of a fusion between the low melting settable insert of the polyurethane adhesive, and the higher melting polyurethane coat of the clothing fabric.

The present invention provides a method for heat-sealing the opposing surfaces of planar textile materials which comprises:

a. applying a heat-seal adhesive to at least one of the opposing surfaces of said textiles, and b. pressing the opposing surfaces of said textiles together under heat and pressure to heat-seal said opposing textile surfaces together; wherein c. said heat-seal adhesive is a low-melting polyurethane prepared by reacting at least one diisocyanate with at least one polyol having a molecular weight between about 500 and 5000; and at least one diol which is branched or includes an ether group, and at least one diol which is unbranched, wherein said diols have an average molecular weight less than about 500, and wherein the total hydroxyl group content of said reactants exceeds or equals the total isocyanate content of said reactants.

The polyurethane may be prepared by heating a solvent-free mixture of the polyurethane reaction components. The ratio of isocyanate groups/hydroxyl groups in the reaction mixture times 100, is in the range of from about 96 to 100. The mole ratio of the branched or ether group containing diols to the straight chain diols employed in the reaction mixture is from about 20:80 to 75:25. The diols employed have an average molecular weight less than about 500.

DETAILED DESCRIPTION OF THE INVENTION

The polyurethanes of this invention are prepared by the reaction of (1) a diisocyanate or a mixture of diisocyanates, (2) a polyol or a mixture of polyols such as the polyester or polyether polyols having a molecular weight between about 500 and 5000, and (3) a mixture of low molecular weight diols having an average molecular weight below about 500 which function as chain extenders for the polyurethanes produced during the reaction.

Preferred polyurethane adhesives are prepared from a reaction mixture wherein the hydroxyl group content exceeds the isocyanate group content of the reaction mixture. This aspect of the reaction mixture is defined herein with reference to the characteristic number of the reaction mixture. The characteristic number of the reaction mixture is defined as the equivalency ratio of isocyanate groups/hydroxyl groups times 100. An excess of hydroxyl groups in the reaction mixture is maintained, up to a ratio of at most about 1:1 of isocyanate to hydroxyl groups. The use of reaction mixtures having a characteristic number below about 96 may result in the degradation of strength properties, such as the tensile strength, percent elongation and tear propagation resistance of the product polyurethane. Preferred low-melting polyurethanes are prepared from reaction mixtures having a characteristic number from about 97 to 99.

It has been found that when a reaction mixture having an excess hydroxyl group content is employed, secondary reactions other than the polyurethane reaction, which can lead to undesirable high-melting products, do not occur—even if temperatures as high as 250° C. are reached as a result of the highly exothermic polyurethane reaction. Thus, the use of reaction mixtures having characteristic numbers between about 96 and 100, and preferably between about 97 and 99, result in low-melting polyurethanes having the desirable adhesive properties discussed above, with good reproducibility. The reproducibility of polyurethanes having desirable adhesive properties is good, even when large batches of the reactants are employed.

By employing reaction mixtures having characteristic numbers from about 96 to 100, the polyurethane may be prepared in a solvent-free single step reaction, which comprises heating a mixture of the reaction components, i.e., the diisocyanate, polyol and low molecular weight diols. Since the reaction is solvent-free, it is both cost effective and environmentally compatible. Moreover, the use of the characteristic numbers of this invention results in a lowering of the melting point of the product, without adversely affecting the strength properties of the product. The phrase "strength properties" as employed herein is intended to refer to the tensile strength, ultimate percent elongation, tear propagation resistance as well as the adhesive strength of the polyurethane.

The low molecular weight diols employed in the reaction mixture have molecular weights below about 500. The diol component of the reaction mixture may comprise a mixture of diols which function primarily to lower the melting point of the product, and diols which function primarily to enhance the strength of the product. Preferably, the low molecular weight diol component of the reaction mixture is comprised of at least three diols.

Low molecular weight diols which have side-chains or contain ether groups contribute to the lowering of the melting point of the product. A single melting point lowering diol or a mixture of melting point lowering diols may be employed. Included within this group of diols are, for example, 2,2'-diethylpropane-1,3-diol, neopentyl glycol, diethylene glycol and 1,5-pentane diol.

Diols which contribute to the strength of the final product are primarily the straight chain unbranched diols such as ethylene glycol, 1,4-butane diol and 1,6-hexane diol. In addition to the melting point lowering diols, at least one strength enhancing diol, and preferably two or more strength enhancing diols are employed in the reaction mixture.

It has been found that a combination of two melting point lowering diols synergistically enhances the lowering of the melting point of the product polyurethane. With the high reaction temperatures employed during the polyurethane reaction, it would in general be very difficult to prepare a polyurethane having a melting point below 150° C. if only a single melting point lowering diol were employed in the reaction mixture. If, however, a combination of two melting point lowering diols are employed, polyurethanes having melting points below about 150° C. are readily obtained.

Moreover, a further synergistic effect with regard to the strength of adhesion of the polyurethane to fiber materials is noted when the low molecular weight glycol component of the reaction mixture includes a combination of a branched glycol such as neopentyl glycol, and an ether glycol such as diethylene glycol. Although a single strength enhancing diol may be employed in the reaction mixture, a combination of two or more straight chain diols may also be employed. The use of a combination of strength enhancing diols can further contribute to a lowering of the melting point of the product.

The low molecular weight diol component of the reaction mixture may comprise a combination of three diols. Preferred low melting polyurethanes are prepared from reaction mixtures wherein at least one of the low molecular weight diols employed in the reaction mixture is neopentyl glycol, 2,2'-diethylpropane-1,3-diol, diethylene glycol or 1,5-pentane diol, and at least one of the other diols employed in the diol mixture is 1,4-butane diol or 1,6-hexane diol. Moreover, the preferred polydiols are polyesters having a molecular weight between about 1000 and 2000.

The equivalency ratio, i.e., mole ratio, of the primarily melting point lowering diols to the primarily strength enhancing diols can be altered with regard to the intended application of the polyurethane product. The mole ratio of melting point lowering diols to strength enhancing diols may vary from about 20:80 to about 75:25. The content of the strength enhancing diols employed in the reaction mixture can be reduced when the diisocyanate content of the reaction mixture is high. A high diisocyanate content will result in a hard polyurethane having a high urethane content, which contributes considerably to the strength of the polyurethane product. On the other hand, softer polyurethanes having good strength and low melting points are obtained if the content of the strength enhancing diols predominates in the mixture.

Although the determination of a clear boundary between "soft" and "hard" polyurethanes is practically impossible, such a boundary may be delineated with reference to a medium hardness range obtained when the weight ratio of the diisocyanate to the polydiol component in the reaction mixture is from about 50 to 70 parts diisocyanate to about 100 parts polydiol—especially where the diisocyanate is an aliphatic diisocyanate such as 1,6-hexamethylene-diisocyanate and the polydiol is a polyester having a molecular weight of from about 1000 to about 2000.

The polydiols and/or polydiol mixtures which are employed as components of the reaction mixture may be described, in general, as compounds having hydroxyl end groups, and having molecular weights above about 500 and up to about 5000. Preferably, the polydiols have a molecular weight between about 1000 and 2000.

The polydiol component of the reaction mixture may be a polyether or a polyester-polydiol. The polyester may be a polyester having an adipic acid base, wherein the diol component of the polyadipate may be one of the following diols, or a mixture of one or more of the following diols: ethylene glycol, propane diol, 1,4-butylene glycol, neopentyl glycol, 1,6-hexane diol and others. Polycaprolactone may also be employed as the polydiol component of the reaction mixture. Among the polyethers, polydiols of the tetrahydrofuran type are suitable for use as the polydiol component of the reaction mixture.

The diisocyanate component of the reaction mixture may be an aromatic diisocyanate such as 4,4'-diphenylmethane-diisocyanate (MDI) (or derivatives such as carbodiimide-modified MDI), or ditolyl-diisocyanate. The diisocyanate may also be a cycloaliphatic diisocyanate such as isophoron diisocyanate or an aliphatic diisocyanate such a 1,6-hexamethylene-diisocyanate or 2,2,4-trimethyl-1,6-hexamethylene-diisocyanate. As for the polydiol component of the reaction mixture, a single diisocyanate may be employed, or a mixture of diisocyanates may be employed.

It should be noted that in addition to components of the reaction mixture discussed above, i.e., the diisocyanate, polydiol, and low molecular weight diols, optionally small amounts of monofunctional compounds containing active hydrogen may be added to the reaction mixture. Such monofunctional compounds include alcohols, amines or amides such as dibutylamine, neopentyl alcohol, ε-caprolactam and others. The amount of monofunctional compounds employed may be less than 5 mole percent, and preferably less than 3 mole percent of the equivalent total amount of low molecular weight diols employed.

The addition of small amounts of the monofunctional compounds aids in lowering the melting point of the product, without adversely affecting its strength properties, such as tensile strength, ultimate percent elongation, tear propagation resistance or adhesive strength. Thus, when a monofunctional compound is employed the amount of one of the melting point lowering diol compounds employed in the mixture of melting point lowering diols may be reduced accordingly. Moreover, when a monofunctional compound is employed, the second melting point lowering component in the diol mixture may be eliminated entirely.

In accordance with the present method, relatively soft polyurethanes with a low urethane content, as well as hard polyurethanes having a relatively high urethane content may be prepared. Thus, the starting temperature for the reaction may vary. The term "starting temperature" is intended to refer to the temperature to which the reaction mixture is initially heated. For example, mixtures of the above-described components for the polyurethane reaction, containing 80 or more parts of a diisocyanate per 100 parts by weight of a polyester having a molecular weight of about 2000, are heated to only about 50° to 60° C. However, the starting temperature is increased as the diisocyanate content of the mixture decreases. For example, the starting temperature is increased to about 100° C. for reaction mixtures containing about 30 parts diisocyanate per 100 parts of a polyester having a molecular weight of about 2000.

The high temperature which occur toward the end of the polyurethane reaction do not adversely affect either the quality of the product or the reproducibility of the high quality polyurethanes produced by the process. Advantageously, as a result of the high reaction temperatures, a practically complete conversion of the starting components into the fully reacted polyurethanes takes place in a short time. Moreover, as a result of the final reaction temperatures which may be as high as from about 200° to 240° C., the subsequent processing of the polyurethane, such as the pouring of the polyurethane from the reaction vessel into flat receptacles or onto conveyor belts is facilitated due to the relatively low viscosity of the final product. Under the reaction conditions of the present process, the often required post-tempering to complete the conversion of residual isocyanate into polyurethane is unnecessary. For example, for a reaction mixture containing 100 parts by weight diisocyanate, per 100 parts by weight of polyester, heat is supplied to the reaction mixture until a temperature of about 50° C. is reached. The reaction is complete within 15 to 20 minutes after the starting temperature is reached.

The low molecular polyurethanes prepared in accordance with the method described herein have particularly good tensile strength. The tensile strength for these products measured according to DIN 53371, is greater than about 10 N/mm$^2$. For the preferred polyurethanes, the tensile strength is greater than about 15 N/mm$^2$. A tensile strength of this magnitude is particularly desirable for polyurethanes which are to be employed as spunbonded fabric heat-seal adhesives or as adhesive compounds for use between two planar textile materials, which will reliably provide a strong bond.

The low-melting polyurethane heat-seal adhesives, described herein, differ from known polyurethanes in that their heat-sealing adhesive properties are optimal. Moreover, as discussed above, the polyurethanes of this invention have greater tensile strength than known polyurethanes. The polyurethanes described herein do not penetrate into the textiles to which they are applied and do not therefore alter the outer surface of sensitive materials, such as the polyurethane coated fabrics discussed above.

The high tensile strength of the polyurethanes of this invention is the result of the use of the particular reaction mixtures of this invention. In principle it is possible to prepare low-melting polyurethanes by employing larger amounts of monofunctional compounds such as amines, amides or alcohols in a reaction mixture containing the bifunctional reactants. However, the polyurethanes produced from such a reaction mixture are relatively short-chained and, therefore, have a relatively poor property profile, and do not have the tensile strength of the polyurethanes prepared employed the reaction mixtures described herein.

As an alternative to the single-step process described herein, in accordance with which the components of the reaction mixture, whether liquid or solid, may be placed in the reaction vessel in any order, the polyurethanes may be prepared from the described reactants in accordance with a known two-stage or multi-stage reaction procedure. Moreover, as an alternative to the batch process described herein, the polyurethanes may be prepared by a continuous process. For example, a reaction extruder may be employed for the continuous production of the polyurethanes.

The examples which follow illustrate the use of the polyurethane heat-seal adhesives described herein in the form of spunbonded fabrics.

EXAMPLE 1

A reaction mixture is prepared containing:
34.60 kg of a polybutylene glycol-ethylene glycol-adipic acid polyester with an OH-number of 56 and a molecular weight of 2000;
27.70 kg of 1,6-hexamethylene-diisocyanate;
6.0 kg of neopentyl glycol;
4.0 kg of diethylene glycol;
5.0 kg of 1,4-butane diol.

The mixture has a characteristic number of 98.

Method of Preparation

The preparation is carried out in a single step. The polyester, glycols and the diisocyanate are placed in a reaction vessel and heated to 60° C. while being stirred. Due to the exothermic nature of the reaction, the temperature rises to 200° C. in about 20 minutes. At this point, the polyurethane is poured into flat containers.

| Properties of the Polyurethane | |
| --- | --- |
| Melting range: (measured on the Kofler heating bank) | 115 to 125° C. |
| Melting index: (2.16 kg at 140° C.) | 40 g/10 min |
| Strength Properties of a Pressed Foil 0.3 mm Thick | |
| Tensile strength (N/mm$^2$): (as per DIN 53371) | 11.5 |
| Ultimate elongation (%): (as per DIN 53371) | 560 |
| Tear propagation resistance (N/mm): (as per DIN 53356) | 43.4 |

The product polyurethane granulate produced is melted in a conventional manner in an extruder, and is spun by means of suitable nozzles. The polyurethane thermally-bonded spun-fabric produced has a weight of about 15 g/m$^2$. The polyurethane is spun as a randomly oriented fabric, onto a fabric carrier having a weight of about 30 g/m$^2$.

The settable insert obtained in this manner is ironed against a raincoat fabric, the inner surface of which, i.e., the surface, to which the settable insert is applied, is completely coated with a layer of polyurethane. The setting can be carried out with a conventional platen press or with modern continuous presses. When ironed with a platen press at a pressure of 350 mbar, for 10 sec with a plate temperature of 100° to 160° C., the following separation values are obtained for a separation force measurement as per DIN E 54 310 (in N/5 cm strip width); the fabric is torn off in all cases:

| 100 | 120 | 140 | 150 | 160 | °C. |
| --- | --- | --- | --- | --- | --- |
| 6.8 | 6.9 | 13.5 | 17.1 | 12.2 | N/5 cm |

After a chemical cleaning of the bonded fabric with perchloroethylene as per DIN E 54 303, the bond is as good as it was prior to cleaning. The fabric is torn off during the separation-value test. Similarly, after washing performed at 60° C. as per DIN 53 920, the fabric is torn off during the separation-value test.

After setting in a Rolomatic continuous press at 120° C., the adhesion of the heat-sealed fabric prior to chemical cleaning or washing, as well as after chemical cleaning in percholoethylene, or after washing at 60° C., is so good that the fabric must be torn off.

The surface of the raincoat material remains perfect in all cases, i.e., completely smooth and with a silky sheen.

EXAMPLE 2

15 g/m$^2$ of the polyurethane-polyester mixture are spun onto a fabric of 30 g/m$^2$. The fabric consists of polyamide and polyester staple fibers which are arranged in lengthwise-oriented and crosswise-oriented layers which are bonded in the conventional manner with an acrylate binder. The spun mixture consists of 50% polyurethane and 50% polyesters. The polyurethane adhesive may comprise a mixture of a polyester and a polyurethane containing from about 33 to about 67% by weight of the polyester. The polyesters and polyurethane employed should have comparable melting ranges. The polyurethane employed in this example is the polyurethane of Example 1. The polyester and polyurethane employed have the following melting properties:

| | Melting Point Index 2.16 kg/140° C. g/10 min | Melting Range °C. |
| --- | --- | --- |
| Polyurethane | 40.0 | 115 to 125 |
| Polyester | 3.2 | 120 to 130 |

The polymer mixture is spun, as described in Example 1, as a random fabric onto a fabric carrier comprised of polyamide and polyester staple fibers to provide a settable insert.

The settable insert is ironed against a raincoat material, which is coated with polyurethane over its entire surface. The following separation values result under the test conditions. set forth in Example 1:

| 120 | 130 | 140 | 150 | 160 | °C. |
| --- | --- | --- | --- | --- | --- |
| 10.4 | 10.5 | 9.1 | 8.1 | 12.1 | N/5 cm |

The adhesion is stronger than the spun fabric; the latter is torn apart during the separation value test. The result is the same after chemical cleaning with perchloroethylene and after washing at 60° C. The surface of the raincoat material remains completely unaltered.

EXAMPLE 3 (REFERENCE TEST)

A raincoat material, coated over its entire surface with polyurethane, was bonded to a settable insert which consisted, as in Examples 1 and 2, of a spunbonded fabric. However, polyvinylchloride-polyvinylacetate mixed polymers to which about 100% by weight plasticizer was added, were employed as the heat-seal adhesive.

The following separation values are obtained:

| 120 | 140 | 150 | 160 | °C. |
|---|---|---|---|---|
| 0.85 | 4.8 | 11.7 | 13.0 | N/5 cm |

After the adhesive sets, alterations in the appearance of the surface of the raincoat material are noted. The surface is wavy and exhibits the well-known "orange peel effect". This effect is particularly pronounced for inserts which are set at 150° C. and 160° C. Since polyvinylchloride plastisoles damage the textile materials to which they are applied, they are not considered suitable for use as heat-seal adhesives.

EXAMPLE 4

Heat-seal adhesives may also be prepared from reaction mixtures including the components listed below. The polyurethane is prepared in accordance with the procedure of Example 1.

Formulation A

A reaction mixture is prepared containing:
20.00 kg of a polybutylene glycol-ethylene glycol-adipic acid polyester with an OH-number of 56 and a molecular weight of 2000
16.80 kg of 1,6-hexamethylene diisocyanate
4.37 kg of neopentyl glycol
4.50 kg of 1,4-butane diol.
The mixture had a characteristic number of 98.

| Properties of the Polyurethane | |
|---|---|
| Melting Range: (Kofler heating bench) | 120 to 130° C. |
| Melting Index: (2.16 kg at 140° C.) | 28.0 g/10 min |

It should be noted that the polyurethane prepared from the reaction mixture set forth above will have less adhesive strength than the polyurethane of Example 1. This is a result of the fact that the polyurethane of Example 1 contains both diethylene glycol and neopentyl glycol, whereas the polyurethane of this example does not contain the strength enhancing neopentyl glycol and ethylene glycol mixture.

Formulation B

A reaction mixture is prepared containing:
20.00 kg of a polybutylene glycol-ethylene glycol adipic acid polyester with an OH-number of 56 and a molecular weight of 2000
12.00 kg 1,6-hexamethylene diisocyanate
2.08 kg neopentyl glycol
2.69 kg 1,6-hexane diol
1.80 kg 1,4-butane diol.
The mixture has a characteristic number of 98.

| Properties of the Polyurethane | |
|---|---|
| Melting Range: (Kofler heating bench) | 120 to 130° C. |
| Melting Index: (2.16 kg at 140° C.) | 44.0 g/10 min |
| Strength Properties of a Pressed Foil 0.3 mm Thick | |
| Tensile Strength (N/mm²): (as per DIN 53371) | 16.8 |
| Ultimate Elongation (%): (as per DIN 53371) | 650 |
| Tear Propagation Resistance (N/mm): (as per DIN 53356) | 48.5 |

Formulation C

A reaction mixture is prepared containing:
20.00 kg of a polybutylene glycol-ethylene glycol adipic acid polyester with an OH-number of 56 and a molecular weight of 2000
12.00 kg 1,6-hexamethylene diisocyanate
1.66 kg neopentyl glycol
2.69 kg 1,6-hexane diol
2.16 kg 1,4-butane diol.
The mixture has a characteristic number of 98.

| Properties of the Polyurethane | |
|---|---|
| Melting Range: (Kofler heating bench) | 120 to 130° C. |
| Melting Index: (2.16 kg at 140° C.) | 53.0 g/10 min |
| Strength Properties of a Pressed Foil 0.3 mm Thick | |
| Tensile Strength (N/mm²): (as per DIN 53371) | 17.2 |
| Ultimate Elongation (%): (as per DIN 53371) | 580 |
| Tear Propagation Resistance (N/mm): (as per DIN 53356) | 57.0 |

This invention has been described in terms of specific embodiments set forth in detail herein. It should be understood, however, that these are by way of illustration only and that the invention is not necessarily limited thereto. Modifications and variations will be apparent from this disclosure and may be resorted to without departing from the spirit of this invention, as those skilled in the art will readily understand. Accordingly, such variations and modifications of the disclosed embodiments are considered to be within the scope of this invention and the following claims.

We claim:

1. A method for heat-sealing planar textile materials which comprises:
    (a) applying a heat-seal adhesive in the form of a spun-bonded fabric to a polyurethane coated fabric; and
    (b) pressing said spun-bonded adhesive and polyurethane coated fabric together under heat and pressure to heat-seal said spun-bonded fabric to said polyurethane coated fabric; wherein
    (c) said heat-seal adhesive is a polyurethane which melts below about 150° C., prepared by reacting a solvent-free mixture of at least one diisocyanate, polybutylene glycol-ethylene glycol-adipic acid polyester having a molecular weight of about 1,000 to about 2,000 and an hydroxyl number of about 56, and a mixture of three diols comprising neopentyl glycol, diethylene glycol and 1,4-butane diol; and in the ratio of isocyanate to hydroxyl groups of the reactants in said reaction mixture times 100 being from about 96 to about 100; and said heat-seal adhesive has a melting range which is below about 125° C.

2. The method according to claim 1 wherein said polyurethane coated fabric is a polyurethane coated poplin fabric.

3. The method according to claim 2 wherein said reaction mixture is comprised of about 50 to 70 parts of a diisocyanate which is 1,6-hexamethylene diisocyanate and about 100 parts of said polyester.

4. The method according to claim 1 wherein said reaction mixture further includes a monofunctional compound selected from the group consisting of dibutylamine, $\epsilon$-caprolactam, neopentyl alcohol or mixtures thereof, wherein the amount of said monofunctional compound comprises less than about 5 mole percent of the total amount of said diols in said reaction mixture; and wherein said polyurethane coated fabric is a polyurethane coated poplin fabric.

5. A method of heat-sealing planar textile materials which comprises:
(a) applying a heat-seal adhesive in the form of a spun-bonded fabric to at least one of the surfaces of a textile material, and
(b) pressing said spun-bonded fabric and textile together under heat and pressure; wherein
(c) said heat-seal adhesive is a polyurethane adhesive which melts below about 150° C., which is prepared by reacting a solvent-free mixture of a diisocyanate, a polybutylene glycol-ethylene glycol-adipic acid polyester, and a mixture of at least three diols wherein at least one diol is branched or includes an ether group, and at least one diol in said mixture is an unbranched diol, wherein the average molecular weight of said diols is less than about 500; and wherein the ratio of isocyanate groups to hydroxyl groups in said reaction mixture times 100 is from about 96 to about 100.

6. The method according to claim 5 wherein said polyester has a molecular weight of from about 1,000 to about 2,000.

7. The method according to claim 5 wherein the mole ratio of said branched or ether group containing diols to said unbranched diols is within the range of from about 20:80 to about 75:25.

8. The method according to claim 7 wherein at least one diol of the reaction mixture is selected from the group consisting of neopentyl glycol, 2,2'-diethylpropane-1,3-diol, diethylene glycol and 1,5-pentane diol; and of the other diols comprising said diol mixture at least one other diol is selected from the group consisting of ethylene glycol, 1,4-butane diol or 1,6-hexane diol.

9. A method for heat-sealing planar textile materials which comprises:
(a) applying a heat-seal adhesive in the form of a spun-bonded fabric to at least one of the surfaces of a textile, and
(b) pressing the opposing surfaces of said textile and spun-bonded fabric together under heat and pressure to heat-seal them together; wherein
(c) said heat-seal adhesive is a polyurethane which melts below about 150° C., prepared by reacting a solvent-free mixture of at least one diisocyanate, a polyester having a molecular weight of from about 500 to about 5,000, and a mixture of at least three diols, wherein said diol mixture is comprised of at least one diol which includes an ether group, at least one branched diol and at least one unbranched diol component, and wherein the average molecular weight of said diols in said mixture is less than about 500; and wherein the ratio of isocyanate groups to hydroxyl groups in the reaction mixture times 100 is from about 96 to about 100.

10. The method according to claim 9 wherein said polyurethane is prepared from a reaction mixture of polybutylene glycol-ethylene glycol adipic acid polyester having an OH-number of 56, and a molecular weight of 2000; 1,6-hexamethylene diisocyanate, neopentyl glycol, diethylene glycol, and 1,4-butane diol; and wherein said polyurethane is applied to said fabric in the form of a thermally bonded spun fabric.

11. The method in accordance with claim 9 wherein said mixture of diols is comprised of neopentyl glycol, diethylene glycol and at least one unbranched diol component; said polyester is a polybutylene glycol-ethylene glycol-adipic acid polyester having a molecular weight of from about 1,000 to 2,000, and wherein the melting range of said adhesive is below about 125° C.

12. The method according to claim 9 wherein said polyester is a polybutylene glycol-ethylene glycol-adipic acid polyester having a molecular weight of about 1,000 to about 2,000.

13. The method according to claim 11 wherein said polyester is a polybutylene glycol-ethylene glycol-adipic acid polyester having a molecular weight of about 2,000 and an OH number of about 56.

14. The method according to claim 9 wherein said polyurethane is prepared by reacting a solvent-free mixture comprised of about 50 to 70 parts of a diisocyanate and 100 parts by weight of a polyester which is a polybutylene glycol-ethylene glycol-adipic acid polyester having a molecular weight of from about 1,000 to about 2,000, in the presence of a diol mixture comprised of neopentyl glycol, diethylene glycol and a third unbranched diol component.

15. The method according to claim 14 wherein at least one surface of said textile is polyurethane coated.

16. The method according to claim 15 wherein said fabric is a polyurethane coated poplin fabric.

17. The method according to claim 11 or 5 wherein the ratio of isocyanate groups/hydroxyl groups times 100 in said reaction mixture is within the range of from about 97 to about 99.

18. The method according to claim 11 or 5 wherein said diisocyanate is 1,6-hexamethylene-diisocyanate.

19. The method according to claim 11 or 5 wherein said mixture further includes at least one monofunctional compound having an active hydrogen, wherein said monofunctional compounds are selected from the group consisting of the amines, amides and alcohols; wherein the amount of said monofunctional compounds comprises less than about 5 mole percent of the total amount of said low molecular weight diols in said reaction mixture.

20. The method according to claim 19 wherein said monofunctional compound is selected from the group consisting of dibutylamine, $\epsilon$-caprolactam, neopentyl alcohol or mixtures thereof.

21. The method according to claim 11 or 5 wherein said polyurethane is applied to said fabric in the form of a thermally bonded spun fabric.

22. The method according to claim 6 wherein said polyurethane is applied to said fabric in the form of a thermal bonded spun fabric.

23. The method according to claim 18 wherein said polyurethane is applied to said fabric in the form of a thermal bonded spun fabric.

24. The method according to claim 19 wherein said polyurethane is applied to said fabric in the form of a thermal bonded spun fabric.

25. The method according to claim 20 wherein said polyurethane is applied to said fabric in the form of a thermal bonded spun fabric.

26. The method according to claim 21 wherein said spun fabric further includes a thermally settable polyester, having a melting range which is about equal to the melting range of said polyurethane.

27. The method according to claim 26 wherein said spun fabric includes from about 33 to about 67 percent by weight of said polyester.

28. The method according to claim 21 wherein at least one of said textiles is a fabric which has been coated with polyurethane.

* * * * *

UNITED STATES PATENT AND TRADEMARK OFFICE
CERTIFICATE OF CORRECTION

PATENT NO. : 4,310,373
DATED : January 12, 1982
INVENTOR(S) : Günter Schuhmacher, Erich Fahrbach and Sepp Wagner It is certified that error appears in the above—identified patent and that said Letters Patent is hereby corrected as shown below:

Column 6, line 9, delete "temperature" and insert --temperatures--.

Column 6, line 63, delete "employed" and insert --employing--.

Column 8, line 46, after the word "conditions" delete ".".

Signed and Sealed this

Sixth Day of July 1982

[SEAL]

Attest:

GERALD J. MOSSINGHOFF

Attesting Officer     Commissioner of Patents and Trademarks